3,205,256
METHOD FOR THE PREPARATION OF TRANS- AND CIS - 1,4 - CYCLOHEXANE-DIMETHYLENE-BIS-CHLOROCARBONATE
Walter Stumpf, Marl, Germany, assignor to Chemische Werke Huls Aktiengesellschaft, Kreis Recklinghausen, Germany, a corporation of Germany
No Drawing. Filed Mar. 22, 1963, Ser. No. 267,336
Claims priority, application Germany, July 28, 1962, C 27,578
2 Claims. (Cl. 260—463)

It is known that 1,4-cyclohexane-dimethylol can be prepared by catalytic hydrogenation of the ester of terephthalic acid or hexadydroterephthalic acid. The ratio in which the trans- and cis-forms of the 1,4-cyclohexane-dimethylol are formed will depend on the conditions of the hydrogenation. The trans-cis ratio can be, approximately, 4:1, 3:1, 2:1, 1:1, 1:4 and so on. The mixtures of isomers so obtained can be separated into the respective isomeric esters by conversion to the benzoates and fractional crystallization, and by saponification the separated trans- and cis-forms of the 1,4-cyclohexane-dimethylol can be obtained. Attempts have been made also to separate the mixtures of trans- and cis-1,4-cyclohexane-dimethylol by recrystallization without esterification. Acetic ester can be used for this purpose but the enrichment of the trans-isomers by the fractional crystallization will amount to only a few percent and it becomes necessary to repeat the recrystallization several times, a wasteful operation. Therefore, the above described methods can not be used industrially.

It has been found that a valuable new ester of the chlorocarbonic acid will be obtained if 1,4-cyclohexane-dimethylol is converted by use of phosgene to 1,4-cyclohexane-dimethylene-bis-chlorocarbonate.

For example, if a mixture of trans- and cis-1,4-cyclohexane-dimethylol is added to liquid phosgene, a mixture of trans- and cis-1,4-cyclohexane-dimethylene-bis-chlorocarbonate is formed by rapid reaction and under vigorous evolution of hydrochloric acid.

Within a short period of time while the reaction is still in progress the trans-1,4-cyclohexane-dimethylene-bis-chlorocarbonate

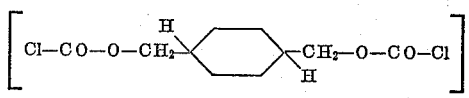

begins to crystallize out in the form of colorless needles while the cis-1,4-cyclohexane-dimethylene-bis-chlorocarbonate remains in the solution. Surprisingly, the trans-1,4 - cyclohexane - dimethylene - bis-chlorocarbonate is so difficultly soluble in phosgene that even by use of a large excess of phosgene the yield will be almost quantitative. The liquid cis-1,4-cyclohexane-dimethylene-bis-chlorocarbonate is obtained from the solution by the evaporization of the phosgene.

It is also possible to evaporate the excess phosgene from the reaction mixture upon the conclusion of the reaction without regard to the crystallization. The trans-form crystallizes, for all practical purposes quantitatively, from the resulting mixture of trans- and cis-1,4-cyclohexane-dimethylene-bis-chlorocarbonate and can be separated easily from the liquid cis-form by suction, pressing or centrifuging. The crystals of the trans-form can be washed with a solvent, for example a hydrocarbon or a chlorohydrocarbon such as benzene, benzine, cyclohexane, n-hexane or carbon tetrachloride. The trans-1,4-cyclohexane - dimethylene - bis-chlorocarbonate will melt after this treatment at a temperature between 66° and 70° C.

If the trans-ratio in the starting mixture is very high, the cis-form of the bis-carbonate will contain a small amount of the trans-form, usually between a few tenths of one percent and approximately one percent. The crystallized trans-form of the 1,4-cyclohexane-dimethylene-bis-chlorocarbonate is very pure and can be utilized without additional purification for chemical reactions like the cis-form. Small amounts of trans-1,4-cyclohexane - dimethylene - bis - chlorocarbonate can be separated from the cis-form by cooling, for example at a temperature between 0° and 5° C. However, this is necessary only if an exceptional purity of the cis-1,4-cyclohexane-dimethylene-bis-chlorocarbonate is required. By a single recrystallization from hydrocarbon or chlorohydrocarbon solvent the trans-form is obtained completely free of the cis-form. The pure trans-1,4-cyclohexane-dimethylene-bis-chlorocarbonate melts at a temperature between 68° and 71° C.

During the reaction either the phosgene or the 1,4-cyclohexane-dimethylol, or both, can be diluted by an inert solvent, for example by a hydrocarbon or a halogenated hydrocarbon such as carbon tetrachloride, tetrachloroethane or perfluoropropane. It is advantageous to heat the 1,4-cyclohexane-dimethylol which in most instances is at least partially crystalline to approximately 70° C. in order to liquify it completely and to add it drop by drop and under stirring to the liquid phosgene. The differences in temperature between the two components of the reaction will have no adverse effect.

The two isomers generated by the reaction can be saponified easily with water or an alkali. The isomeric 1,4-cyclohexane-dimethylols, prepared in this manner are very pure, a fact which can be proved for example by gas chromatography. By quantitative determination of the trans- and cis-forms of the 1,4-cyclohexane-dimethylols with the acid of the gas chromatography it can be demonstrated that during the series of reactions the trans- or cis-configuration at the cyclohexane ring, or the trans-cis ratio in case of the use of a mixture, will remain unchanged.

The trans- and cis-forms of the 1,4-cyclohexane-dimethylene-bis-chlorocarbonate represent not only valuable intermediary substances for the preparation of the pure trans- and cis-cyclohexane-dimethylol but also, by reaction with alcohols, amines and phenols, for the preparation of carbonic esters and urethanes.

*Example*

In a vessel equipped with stirrer and a low-temperature cooling means there are condensed 1 880 g.=19 mols of phosgene and then 689 g.=4.77 mols of 1,4-cyclohexane-dimethylol, consisting of approximately equal parts of the trans- and cis-forms, and heated to 70° C., are added drop by drop within approximately one hour under stirring and exclusion of moisture. The vessel is cooled by use of ice and water to an inside temperature of approximately 7° to 9° C. (boiling point of the phosgene: 7.6° C.). The stirring is continued for another two hours while the temperature of the bath is allowed to rise to 10° C. The contents of the vessel is then heated gradually to a temperature of approximately 60° C. and the excess of phosgene is removed by distillation, and shortly before the conclusion of the process a stream of nitrogen is conducted through the reaction mixture. Phosgene residues are then removed by evacuation to approximately 15 to 20 torr by use of a water operated aspirator. The mixture of trans- and cis-1,4-cyclohexane-dimethylene-bis-carbonate, a colorless, viscous liquid with an ester-like odor is poured, while still warm, into a container and kept in the desiccator over KOH at approximately 15 torr. Yield: 1270 g.=99% of the theoretical value.

1,4 - cyclohexane - dimethylene - bis - chlorocarbonate [$C_{10}H_{14}O_4Cl_2$(269.1)].—Computed: C, 44.63; H, 5.24; O, 23.78; Cl, 26.35. Found: C, 44.63; H, 5.28; Cl, 26.25.

From the mixture the trans-form crystallizes out as colorless needles which are separated very sharply by suction filtration and washed with a small quantity of a cold 2:1 mixture of benzine and carbon tetrachloride. From 1255 g. of mixture there are obtained 625 g. of crystallized pure trans-1,4-cyclohexane-dimethylene-bis-chlorocarbonate, or 49.8% of the mixture. The crystals melt at 66 to 70° C. and can be stored undecomposed in a powder flask for a long time.

*Trans - 1,4 - cyclohexane-dimethylene-bis-chlorocarbonate.*—Found: C, 44.33; H, 5.18; Cl, 26.3.

The wet crystals, after being separated by suction filtration, can also be freed of the liquid cis-form on a porous clay plate but the crystals will then still contain a few tenth of one percent of the cis-form and will melt at 60° to 66° C. The melting point will rise to 68° to 71° C. after one crystallization from benzine to which is added a small quantity (up to one third) of carbon tetrachloride.

The liquid which is separated from the crystals amounts to 585 g.=46.7% of the starting mixture. It consists of the cis-form and contains only a few tenth of one percent of the trans-form.

*Cis-1,4-cyclohexane-dimethylene-bis-chlorocarbonate.*—Found: C, 44.84; H, 5.37; Cl, 26.2.

I claim:

1. Process for the production of pure cis- and trans-1,4 - cyclohexane-dimethylene-bis-chlorocarbonates which comprises introducing a mixture of cis- and trans-1,4-cyclohexane-dimethylol in liquid form into liquid phosgene and separating the trans-1,4-cyclohexane-dimethylene-bis-chlorocarbonate from the cis-isomer in the resulting reaction mixture by fractional crystallization.

2. Process as defined in claim 1 in which the mixture of cis- and trans-1,4-cyclohexane-dimethylol at a temperature of 70° C. is introduced into the liquid phosgene and the temperature of the resulting reaction mixture is maintained at 7–9° C. and the reaction mixture is freed of unreacted phosgene prior to the separation of the trans - 1,4 - cyclohexane-dimethylene-bis-chlorocarbonate from its cis-isomer by crystallization.

References Cited by the Examiner

UNITED STATES PATENTS

| | | | |
|---|---|---|---|
| 2,136,178 | 11/38 | Carothers et al. | 260—463 X |
| 2,370,568 | 2/45 | Muskat et al. | 260—463 |
| 2,397,630 | 4/46 | Strain | 260—463 |
| 2,496,091 | 1/50 | Hammon | 260—463 |
| 2,757,191 | 7/56 | Stilmar | 260—463 |
| 2,778,846 | 1/57 | Theis et al. | 260—463 |
| 2,787,630 | 4/57 | Katz et al. | 260—463 |
| 2,923,732 | 2/60 | Norton | 260—463 |
| 2,959,611 | 11/60 | Nelson et al. | 260—463 |
| 3,008,978 | 11/61 | Brotherton et al. | 260—463 |
| 3,096,359 | 7/63 | Caldwell et al. | 260—463 |

OTHER REFERENCES

Green et al.: J. Chem. Soc. (London), vol. of 1962, pp. 1076–1080.

Olivier et al.: J.A.C.S., vol. 81, pp. 5811–5817 (1959).

CHARLES B. PARKER, *Primary Examiner.*